United States Patent
Husain

(10) Patent No.: US 7,174,987 B2
(45) Date of Patent: Feb. 13, 2007

(54) END OF TRAVEL FEATURE FOR STEER BY WIRE VEHICLE

(75) Inventor: Muqtada Husain, Brownstown, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 120 days.

(21) Appl. No.: 10/687,384

(22) Filed: Oct. 16, 2003

(65) Prior Publication Data

US 2005/0082108 A1 Apr. 21, 2005

(51) Int. Cl.
*B62D 5/00* (2006.01)

(52) U.S. Cl. .................. 180/402; 180/444; 180/446

(58) Field of Classification Search ............... 180/402, 180/403; 701/41, 42
See application file for complete search history.

(56) References Cited

U.S. PATENT DOCUMENTS

| | | | |
|---|---|---|---|
| 3,580,352 A | 5/1971 | Hestad | |
| 4,558,759 A | 12/1985 | Baatrup et al. | |
| 4,940,105 A | 7/1990 | Matsunaga et al. | |
| 5,097,917 A | 3/1992 | Serizawa et al. | |
| 5,247,441 A | 9/1993 | Serizawa et al. | |
| 5,347,458 A * | 9/1994 | Serizawa et al. | 701/41 |
| 5,896,942 A * | 4/1999 | Bohner et al. | 180/402 |
| 5,908,457 A | 6/1999 | Higashira et al. | |
| 6,138,788 A * | 10/2000 | Bohner et al. | 180/402 |
| 6,219,604 B1 * | 4/2001 | Dilger et al. | 701/41 |
| 6,220,385 B1 * | 4/2001 | Bohner et al. | 180/403 |
| 6,244,371 B1 | 6/2001 | Bohner et al. | |
| 6,269,903 B1 | 8/2001 | Bohner et al. | |
| 6,283,243 B1 | 9/2001 | Bohner et al. | |
| 6,285,936 B1 * | 9/2001 | Bohner et al. | 701/41 |
| 6,336,519 B1 | 1/2002 | Bohner et al. | |
| 6,370,460 B1 | 4/2002 | Kaufmann et al. | |
| 6,389,343 B1 * | 5/2002 | Hefner et al. | 701/41 |
| 6,408,235 B1 | 6/2002 | Tanke, II et al. | |
| 6,442,462 B1 * | 8/2002 | Nishizaki et al. | 701/41 |
| 6,481,526 B1 | 11/2002 | Millsap et al. | |
| 6,484,838 B1 * | 11/2002 | B.o slashed.rsting et al. | 180/402 |
| 6,578,444 B1 | 6/2003 | Wendelin | |
| 6,598,695 B1 * | 7/2003 | Menjak et al. | 180/402 |
| 6,681,881 B2 * | 1/2004 | Andonian et al. | 180/402 |
| 6,728,615 B1 * | 4/2004 | Yao et al. | 701/41 |
| 6,938,721 B2 * | 9/2005 | Ono et al. | 180/402 |

(Continued)

OTHER PUBLICATIONS

MRB-2107-3 Product Bulletin from Lord Corporation (webpage, date not available).

*Primary Examiner*—Lesley D. Morris
*Assistant Examiner*—L Lum
(74) *Attorney, Agent, or Firm*—Brinks Hofer Gilson & Lione

(57) ABSTRACT

The present invention provides a system for generating an end of travel feedback to the driver of a vehicle where the vehicle includes a steer by wire system. The system includes a steering wheel, a steering shaft, a motor, and a clutch. The steering wheel is configured to control the steer by wire system. The steering shaft is coupled to the steering wheel and rotates in conjunction with the steering wheel. To provide road feel resistance to the driver, the motor is coupled to the steering shaft. Further, the clutch is configured to mechanically couple the steering shaft to the road wheel to provide mechanical resistance when the road wheel is at an end of travel position.

25 Claims, 2 Drawing Sheets

U.S. PATENT DOCUMENTS

| | | |
|---|---|---|
| 2001/0032749 A1 | 10/2001 | Thomas et al. |
| 2002/0059021 A1 | 5/2002 | Nishizaki et al. |
| 2002/0092696 A1 | 7/2002 | Bohner et al. |
| 2002/0162700 A1 | 11/2002 | Moser et al. |
| 2002/0189888 A1 | 12/2002 | Magnus et al. |
| 2003/0127274 A1 | 7/2003 | Dominke et al. |

* cited by examiner

END OF TRAVEL FEATURE FOR STEER BY WIRE VEHICLE

BACKGROUND

1. Field of the Invention

The present invention generally relates to a steer by wire system. More specifically, the invention relates to an end stop and curb feel feature for a steer by wire system.

2. Description of Related Art

In a conventional steering system, the steering wheel is mechanically connected to the steering shaft. When the mechanical end of travel of the road wheel is reached, the steering wheel cannot be rotated any further due to high mechanical resistance. However, a steer by wire system in normal operation has no mechanical coupling to the road wheel. Therefore, when the end of travel condition is encountered, the driver can continue turning the steering wheel. The lack of feedback force is unfamiliar and may be uncomfortable for some drivers. In addition, extensive use of the steering system in an end of travel condition can cause additional wear to the vehicle.

Also related to steer by wire systems, a mechanical connection is provided as a backup steering technique in the event of a steer by wire system failure. The mechanical steering backup may include an electrically released clutch. In normal operation mode, the clutch will be disengaged providing for operation in steer by wire mode. However, if a sensor anomaly or system failure occurs, the system power will be shut off and the clutch will be automatically engaged. Engaging the clutch provides a mechanical coupling between the steering wheel and the road wheel thereby reverting the system to a manual mechanical steering mode. The driver would then be able to operate the vehicle in an emergency situation despite the system failure.

In view of the above, it is apparent that there exists a need for a system to provide end of travel feedback to the driver of a vehicle having a steer by wire system.

SUMMARY

In satisfying the above need, as well as overcoming the enumerated drawbacks and other limitations of the related art, the present invention provides a system for generating an end of travel feedback to the driver of a vehicle where the vehicle includes a steer by wire system. The system includes a steering wheel, a steering shaft, a motor, and a clutch. The steering wheel is configured to provide input to the steer by wire system. The steering shaft is coupled to the steering wheel such that the steering shaft rotates in conjunction with the rotation of the steering wheel. To provide a simulated road feel to the driver, the motor provides torque to the steering shaft. Further, the clutch is configured to mechanically couple the steering shaft to the road wheel when the road wheel is in an end of travel condition thereby providing mechanical resistance. An end of travel condition can occur due to limits in the range of motion of the steering system or alternatively due to external influences, limiting the angle of the road wheel.

In another aspect of the invention, a controller is integrated with the system and adapted to sense when the road wheel of the vehicle has reached an end of travel position such that the road wheel angle is restricted by the mechanical range of the steering system. When the end of travel position is reached, the controller engages the clutch.

The controller senses the end of travel condition based on the angle of the road wheel, the rate of change of the road wheel, the current draw of a second motor used to manipulate the road wheel, or a combination thereof. Further, the controller is adapted to disengage the clutch when the steering wheel is manipulated to rotate the wheel away from the end of travel position. The controller senses the driver's intent to manipulate the steering wheel away from the end of travel position based on the angle of the steering wheel, the rate of change of the steering wheel angle, the torque applied to the steering wheel, or a combination thereof.

In yet another aspect of the invention, an end of travel condition can occur when the angle of the road wheel is restricted due to the road wheel pushing against an object, such as a curb. When an "against curb" condition is sensed the controller engages the clutch. The against curb condition may be sensed based on the current of the second motor used to control the angle of the road wheel, the angle of the road wheel, the rate of change of the angle of the road wheel, or a combination thereof.

Further objects, features and advantages of this invention will become readily apparent to persons skilled in the art after a review of the following description, with reference to the drawings and claims that are appended to and form a part of this specification.

DETAILED DESCRIPTION

Figure 1:
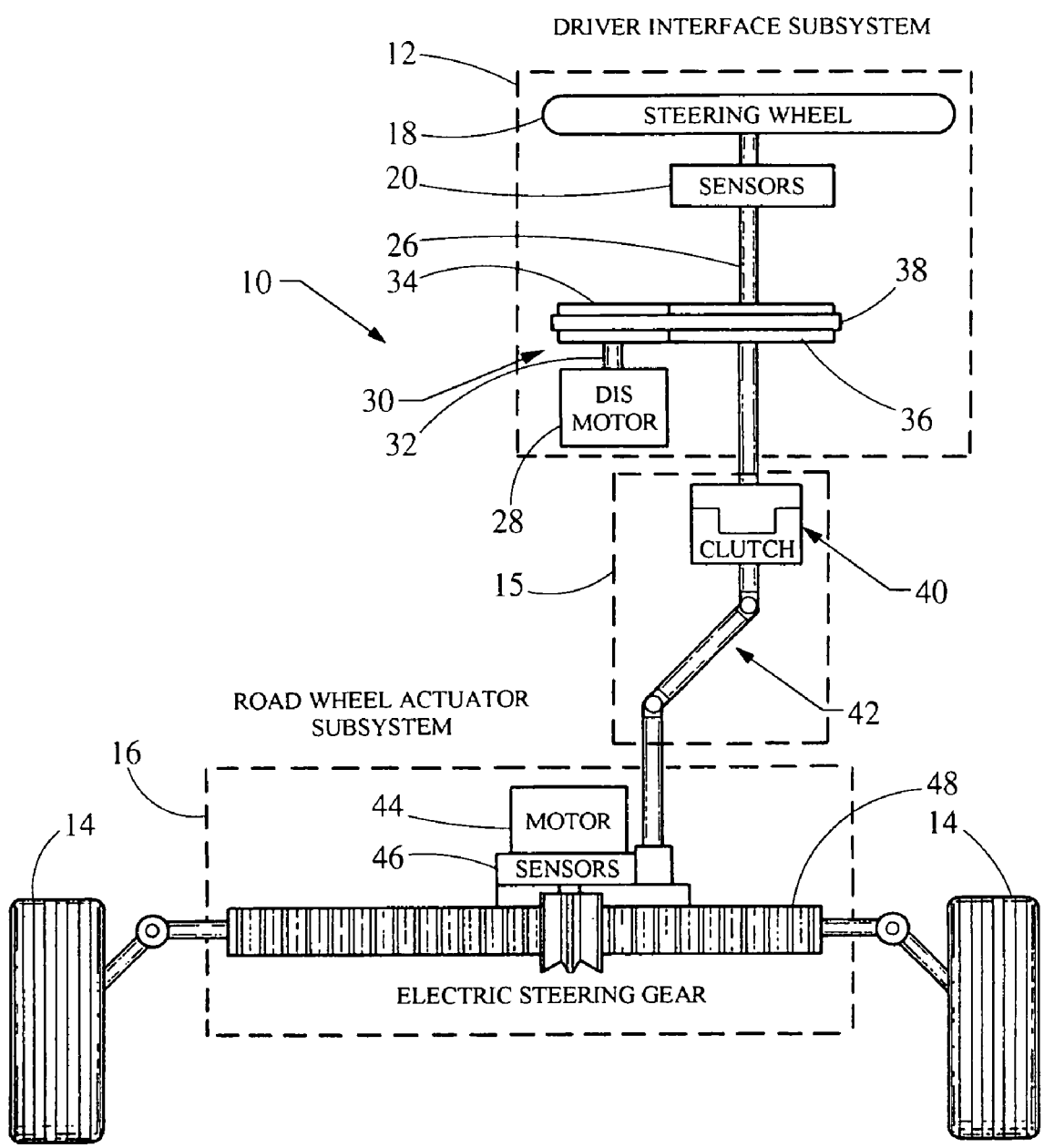
FIG. 1 is a diagrammatic view of a steer by wire system including a manual backup steering subsystem according to the present invention.

Referring now to the drawings, a steer by wire system embodying the principles of the present invention is illustrated therein and designated at 10. As its primary components, the steer by wire system 10 includes a driver interface subsystem 12, a manual backup steering subsystem 15, a road wheel actuator subsystem 16, and road wheels 14. The driver interface subsystem 12 is designed to sense the intent of the driver to control the road wheels 14. Further, the driver interface subsystem 12 provides feedback to the driver corresponding to the instantaneous steering conditions.

Included in the driver interface subsystem 12 is a steering wheel 18, a series of sensors 20, a motor 28, and a steering shaft 26. The steering wheel 18 is connected to the steering shaft 26. As the steering wheel 18 is rotated, it causes the steering shaft 26 to be rotated in the same direction. The sensors 20 are connected to the steering wheel 18 or the steering shaft 26, and determine the steering wheel angle, the rate of change of the steering wheel angle, and the steering torque.

A motor 28 is coupled to the steering shaft 26 by a torque transfer mechanism 30. Based on the current steering conditions and pre-specified parameters such as an adjustable steering ratio, a maximum steering torque, and the desired feel, the driver interface subsystem motor 28 provides feedback torque to the steering wheel 18. The driver interface subsystem motor 28 has a shaft 32 connected to the torque transfer mechanism 30. The torque transfer mechanism 30 includes a first member 34 attached to the shaft 32 and a second member 36 attached to the steering shaft 26. The first member 34 rotates together with the shaft 32 while the second member 36 rotates with the steering shaft 26. The first member 34 is configured to transfer torque to the second member 36. Torque may be transferred between the first and second members through a belt 36 or intermeshing gears. The first member 34 may also be a different size than the second member 36, thereby multiplying the torque provided to the steering shaft 26 by the driver interface subsystem motor 28. The driver interface system motor 28 emulates the feel of the road wheel in a mechanically coupled steering system and provides the proper feel to the driver when turning the steering wheel.

The manual backup steering subsystem 15 is configured to allow the driver to steer the vehicle in the event of a fault condition. When a fault condition occurs, the clutch 40 is engaged and mechanically couples the steering shaft 26 to the steering linkage 42. The direct coupling of the steering shaft 26 to the steering linkage 42 allows the driver to operate the vehicle in a backup mode until the fault condition can be corrected.

Based on the driver input received by the driver interface subsystem 12, the road wheel actuator subsystem 16 manipulates the angle of the road wheels 14. The road wheel actuator subsystem 16 includes a motor 44, sensors 46, and an electric steering gear 48. The motor 44 is controlled in response to the input from the driver, sensed by the driver interface subsystem 12. The motor 44 manipulates the electric steering gear 48 thereby controlling the angle of the road wheels 14. The sensors 46 sense the torque of the motor 44, the temperature of the motor 44, the rate of change of the road wheel angle, and the actual road wheel angle including the end of travel position. Further, the steering linkage 42 from the manual backup steering subsystem 15 is coupled to the electric steering gear 48 allowing the driver to manually manipulate the angle of the road wheels 14 when a steering system fault occurs and the clutch is disengaged.

Figure 2:
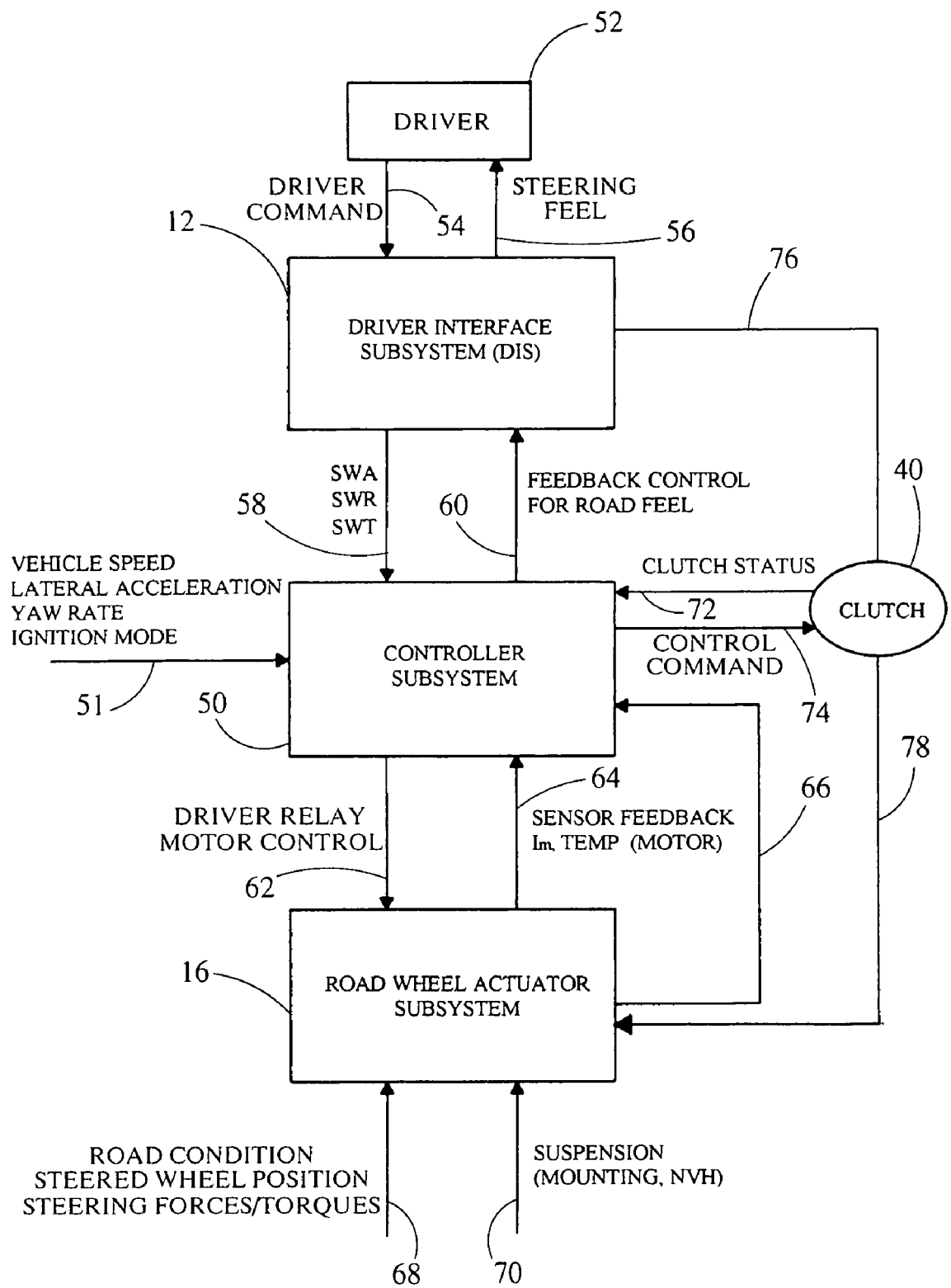
FIG. 2 is a block diagram of the control flow of a steer by wire system according to the present invention.

Now referring to FIG. 2, a block diagram of the control structure of a steer by wire system according to the present invention is shown. The driver represented by block 52 provides an input, as illustrated by line 54, to the driver interface subsystem 12 by turning the steering wheel 18. Conversely, the driver 52 receives feedback from the driver interface subsystem 12 through feedback torque or resistance, as illustrated by line 56, applied to the steering wheel. The driver interface subsystem 12 senses the motion of the steering wheel, driver demand, and determines the desired steering wheel parameters, including steering wheel angle (SWA), the rate of change of the steering wheel angle (SWR), and the steering wheel torque (SWT). The steering wheel parameters are then communicated to the controller subsystem as illustrated by line 58.

In addition to the steering wheel parameters, the controller subsystem 50 also receives vehicle parameters including the vehicle speed, lateral acceleration, yaw rate, and ignition mode as illustrated by line 51. The controller subsystem 50 interprets the vehicle parameters and the steering wheel parameters and generates corresponding motor control signals which are communicated to the road wheel actuator subsystem 16 as illustrated by line 62.

The road wheel actuator subsystem 16 is affected by changing environmental influences, such as the road condition and forces acting on the road wheels, as illustrated by line 68, and by the vehicle dynamics, such as the suspension and mounting structure, as illustrated by line 70. The road wheel actuator subsystem 16 provides feedback to the controller subsystem 50, including the motor current and motor temperature, as illustrated by line 64, and the road wheel angle and the rate of change of the road wheel angle, as illustrated by line 66.

The controller subsystem 50 interprets the feedback parameters provided from the road wheel actuator subsystem 16 and generates control signals that are communicated to the driver interface subsystem 12, as illustrated by line 60. In addition, the controller subsystem 50 continuously monitors for fault signals from both the driver interface subsystem 12 and the road wheel actuator subsystem 16 to determine if a fault condition has occurred. In the event of a fault condition, the controller subsystem 50 engages the clutch 40 through a command signal, illustrated by line 74. Engaging the clutch 40 directly couples the driver interface subsystem 12 to the road wheel actuator subsystem 16 through the clutch 40 as illustrated by lines 76 and 78. The controller subsystem 50 monitors the status of the clutch 40 through a clutch status signal, including clutch engaged or disengaged status, communicated to the controller subsystem as illustrated by line 72.

In one aspect of the present invention, when the controller subsystem 50 receives feedback from the road wheel actuator subsystem indicating the road wheel is in an end of travel position, the controller subsystem 50 provides a control command, as illustrated by line 74, causing the clutch 40 to directly couple the driver interface subsystem 12 to the road wheel actuator subsystem 16. More specifically as shown in FIG. 1, coupling the steering shaft 26 to the electric steering gear 48 through the clutch 40 and steering linkage 42. This mechanical linkage provides an increased resistance on the steering wheel 18, thereby informing the driver that the road wheel 14 is at an end of travel position. Using the clutch 40 as an end of travel feedback mechanism provides a simple and cost effective method to provide feedback to the driver regarding an end of travel condition. Alternatively, if the driver moves the steering wheel 18 in a direction indicating an intent to rotate the tire away from the end of travel position, the controller 50 disengages the clutch 40, as long as no fault condition exists, and the wheel actuates motor 44 to manipulate the road wheels 14 away from the end of travel position.

In another aspect, the controller subsystem 50 monitors the motor current and the rate of change of the road wheel angle to determine if the road wheel 14 movement is being restrained by a curb. In the event the road wheel movement is being restrained by a curb (increased current without a corresponding change in road wheel angle), the controller subsystem 50 provides a control command, illustrated by line 74, energizing the clutch 40. Engaging the clutch 40 directly couples the steering column 26 to the electric steering gear 48 and thus provides resistance in the mechanical coupling to the steering wheel 18 to provide feedback informing the driver that an against curb condition is occurring and preventing the driver from further turning the steering wheel 18.

As a person skilled in the art will readily appreciate, the above description is meant as an illustration of implementation of the principles this invention. The system as described may be used independently or in conjunction with other devices for providing end of stop feedback. This description is not intended to limit the scope or application of this invention in that the invention is susceptible to modification, variation and change, without departing from spirit of this invention, as defined in the following claims.

I claim:

1. A system for providing an end of travel feedback from a road wheel to a driver of a vehicle, the vehicle including a steer by wire system, the system comprising:

a steering wheel configured to control the steer by wire system;

a steering shaft coupled to the steering wheel;
a clutch adapted to couple the steering shaft with the road wheel based on an end of travel condition; and
a controller adapted to sense when the road wheel has reached an end of travel position based on the controller or a sensor and to engage the clutch in response thereto.

2. The system according to claim 1, wherein the controller is adapted to engage the clutch based on a road wheel angle determined by the sensor.

3. The system according to claim 1, wherein the controller is adapted to engage the clutch based on a rate of change of a road wheel angle determined based on the sensor.

4. The system according to claim 1, further comprising a motor to control an angle of the road wheel.

5. The system according to claim 4, wherein the controller is adapted to engage the clutch based on a current draw of the motor sensed by the controller.

6. A system for providing an end of travel feedback from a road wheel to a driver of a vehicle, the vehicle including a steer by wire system, the system comprising;
a steering wheel configured to control the steer by wire system;
a steering shaft coupled to the steering wheel;
a clutch adapted to couple the steering shaft with the road wheel when the road wheel is in an end of travel condition; and
a controller adapted to disengage the clutch when the steering wheel is manipulated to rotate the wheel away from the end of travel position.

7. The system according to claim 6, wherein the controller is adapted to disengage the clutch based on a steering wheel angle determined by a sensor.

8. The system according to claim 6, wherein the controller is adapted to disengage the clutch based on a rate of change of a steering wheel angle determined based on a sensor.

9. The system according to claim 6, wherein the controller is adapted to disengage the clutch based on a torque applied to the steering wheel determined by a sensor.

10. A system for providing an end of travel feedback from a road wheel to a driver of a vehicle the vehicle including a steer by wire system, the system comprising;
a steering wheel configured to control the steer by wire system;
a steering shaft coupled to the steering wheel;
a clutch adapted to couple the steering shaft with the road wheel based on an end of travel condition; and
a controller adapted to sense when a road wheel angle is restricted due to the road wheel pushing against an object determined by the controller or a sensor.

11. The system according to claim 10, wherein the controller is adapted to engage the clutch based on a current draw of a motor configured to control the road wheel angle determined by the controller or the sensor.

12. The system according to claim 10, wherein the controller is adapted to engage the clutch based on the road wheel angle determined by the sensor.

13. The system according to claim 10, wherein the controller is adapted to engage the clutch based on a rate of change of the road wheel angle determined based on the sensor.

14. A method for providing an end of travel feedback to a driver of a vehicle, the vehicle including a steer by wire system and a road wheel, the method comprising the steps of:
controlling the steer by wire system with a steering mechanism; sensing that a road wheel angle of the road wheel is at an end of travel position; and
coupling the steering mechanism to the road wheel mechanically based on the step of sensing that the road wheel angle is at an end of travel position.

15. The method according to claim 14, wherein the steering mechanism is coupled to the road wheel by engaging a clutch.

16. The method according to claim 15, wherein the clutch is engaged based on the road wheel angle.

17. The method according to claim 15, wherein the clutch is engaged based on a rate of change of the road wheel angle.

18. The method according to claim 15, further comprising the step of controlling the road wheel angle using a motor.

19. The method according to claim 18, wherein the clutch is engaged based on a current draw of the motor.

20. A method for providing an end of travel feedback to a driver of a vehicle, the vehicle including a steer by wire system and a road wheel, the method comprising the steps of:
controlling the steer by wire system with a steering mechanism;
sensing a road wheel angle of the road wheel is at an end of travel position;
coupling the steering mechanism to the road wheel mechanically; and
decoupling the steering mechanism from the road wheel when the steering wheel is manipulated to rotate the wheel away from the end of travel position.

21. The method according to claim 20, wherein the steering mechanism is decoupled from the road wheel based on a steering wheel angle.

22. The method according to claim 20, wherein the steering mechanism is decoupled from the road wheel based on a rate of change of a steering wheel angle.

23. The method according to claim 20, wherein the steering mechanism is decoupled from the road wheel based on a torque applied to the steering mechanism.

24. The system according to claim 1, wherein the clutch mechanically couples the steering shaft with the road wheel through a steering linkage.

25. The method according to claim 14, wherein the clutch mechanically couples the steering mechanism to the road wheel through a steering linkage.

* * * * *